April 7, 1970     R. C. OWEN     3,504,790
CONTAINER PACKAGE
Filed Oct. 29, 1968
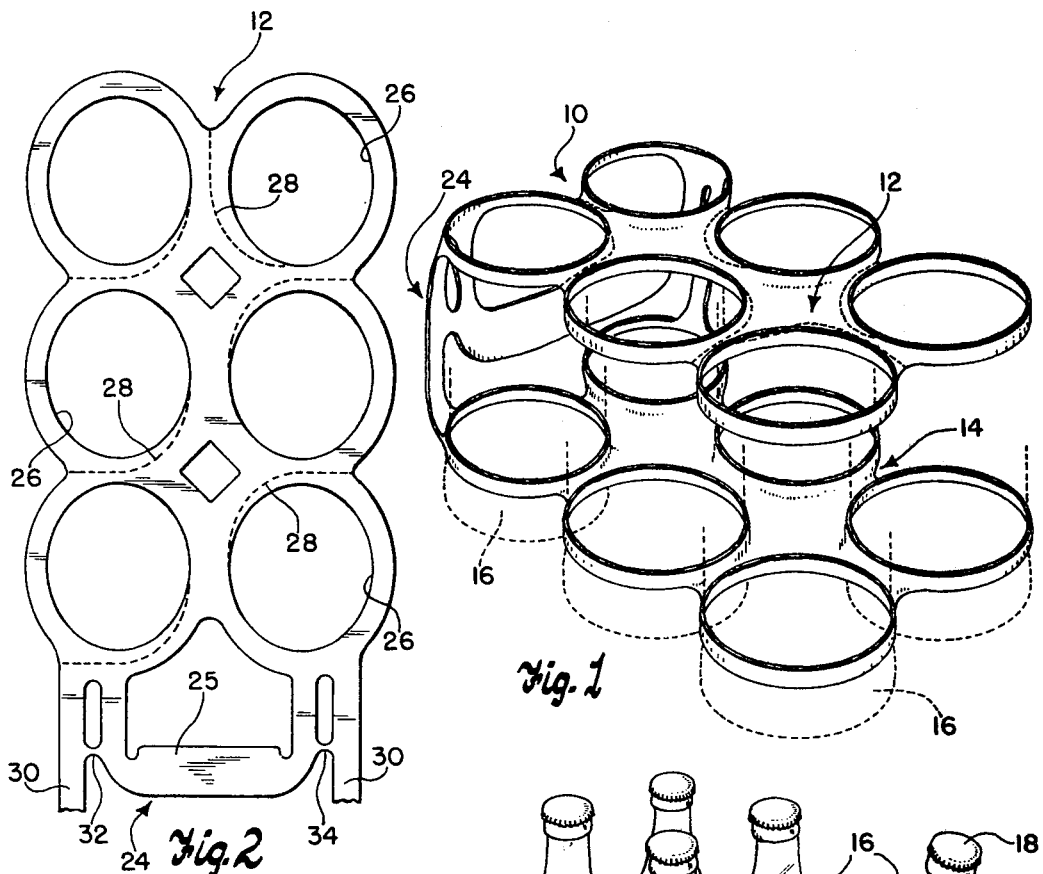
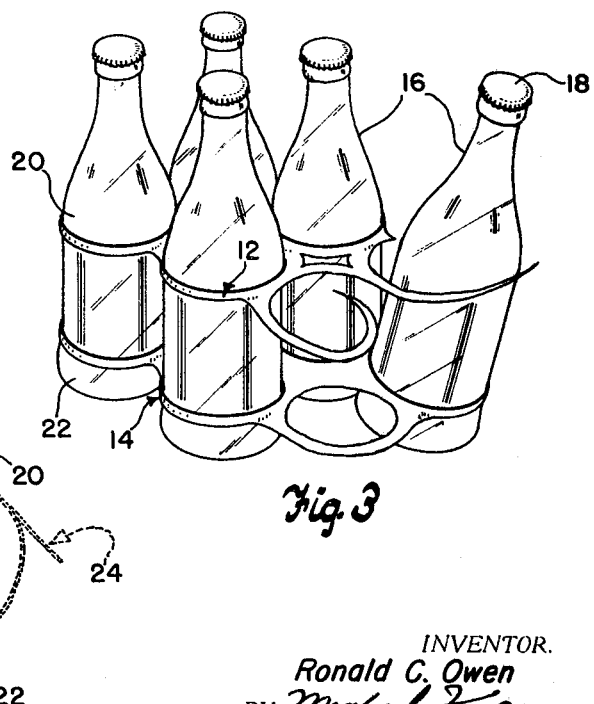
INVENTOR.
Ronald C. Owen
BY
His Att'ys

United States Patent Office 3,504,790
Patented Apr. 7, 1970

3,504,790
CONTAINER PACKAGE
Ronald C. Owen, Harwood Heights, Ill., assignor to Illinois Tool Works Inc., Chicago, Ill., a corporation of Delaware
Filed Oct. 29, 1968, Ser. No. 773,695
Int. Cl. B65d 71/00
U.S. Cl. 206—65                    7 Claims

ABSTRACT OF THE DISCLOSURE

A container package including at least one carrier device made from a resilient, deformable and elastic plastic material providing constrictive apertures therein for receiving containers corresponding in number and placement to the apertures, the carrier device further including weakened lines configured and arranged relative to the apertures to permit separation or removal of the containers when the weakened line is broken or severed.

---

The success achieved in the multipackaging of beverage cans through the use of plastic sheet carriers of the type disclosed and claimed in U.S. Patent No. 2,874,835 has caused increased attention of multipackaging users in the returnable and throw-away bottle field. The standards which are imposed on the multipackaging of returnable and throw-away bottles require the bottles to be held and retained in such a manner in the package that they will not be subject to breakage during handling thereof. Thus, it is necessary to develop a multipackaging device which will restrain movement of the glass containers until it is desired to remove them from the package for consumption of the contents thereof.

There have been several recommendations as to potential multipackaging devices for glass bottles of either the returnable or throw-away type, several examples of which are shown in U.S. Patent Nos. 3,084,792, 3,086,651 and 3,330,408. In general, the multipackaging devices shown in the above patents are satisfactory; however, it is a primary object of the present invention to provide a new and improved container carrier device for returnable and throw-away glass bottles which not only functions in a satisfactory manner, but which is also simple in construction, easy to assemble to containers by known methods and apparatus, economical to produce by existing techniques and facilitates separation of the containers from the multipackaging device when such is desired.

A further object of the present invention is to provide a container package which is provided with weakened portions configured and arranged relative to the packaging device for efficient and rapid separation of containers therefrom when desired.

The above and other objects and advantages of the present invention are attained by the provision of at least one carrier device for retaining and transporting a plurality of similarly configured containers which are arranged in side-by-side substantially abutting relationship, the carrier device comprising a substantially unsupported sheet of resilient, deformable and elastic plastic material with a plurality of apertures provided therein corresponding in number to the containers, the material adjacent each aperture of the carrier device being substantially circumferentially continuous and uninterrupted whereby upon the insertion of the containers in the apertures, the material adjacent each aperture is stretched and deformed to the shape of axially directed neck portions which circumferentially embrace and resiliently grip the containers together as a group, the carrier device further being provided with a weakened line adjacent each aperture which extends from the outer periphery of the sheet and generally parallel the peripheral configuration of each aperture at least across the longitudinal or transverse midline thereof prior to intersecting the inner periphery of each aperture at an interior margin of the carrier device.

A better understanding of the present invention and its organization and construction may be had by referring to the description below in conjunction with the accompanying drawings wherein:

FIG. 1 is a perspective view of one form of multipackaging device for glass bottles and the like, partially shown in phantom lines, which is constructed in accordance with the teachings of the present invention;

FIG. 2 is a fragmentary top plan view of one element of the multipackaging carrier device illustrated in FIG. 1;

FIG. 3 is a perspective view of a container package illustrating the manner in which containers are removed from the multipackaging device illustrated in FIGS. 1 and 2; and FIG. 4 is a side elevational view showing a container package of the present invention with several forms of handle devices illustrated in phantom or hidden lines.

Although the multipackaging device shown in the drawing includes a pair of spaced carrier elements which engage containers in the package at axially spaced portions thereof, it will be appreciated from the discussion that is to follow that a single carrier element having weakened lines therein in accordance with the teachings of the present invention may be used for the multipackaging of metal cans and the like.

As illustrated in the drawing, the preferred form of the multipackaging device 10 includes a pair of upper and lower carrier elements 12, 14 which are designed to engage the glass containers 16 having crowned caps 18 along axially spaced portions thereof as best depicted in FIG. 3 of the drawing, each of the glass containers or bottles 16 are also preferably provided with upper and lower annular enlargements 20, 22 for use in connection with the carrier devices 12, 14.

In the embodiment illustrated in the drawing, the carrier elements 12, 14 are interconnected by an integral handle strap arrangement 24 which will be discussed hereafter in connection with other possible handle or carrying means for the container package.

Each of the upper and lower carrier elements 12, 14 of the multipackaging device 10 are generally similar in construction and made from the same material, and thus a description of one of such carrier elements will suffice in an understanding of the present invention. It is to be understood, however, that the means employed to facilitate separation of the glass containers or bottles 16 from the multipackaging device 10 may be used in one or both of the carrier elements 12, 14 as is desired.

As best depicted in FIG. 2 of the drawing, the carrier element 12 comprises a substantially unsupported sheet of resilient, deformable and elastic plastic material, polyethylene being a preferred example, which is provided with a plurality of apertures 26 which correspond in number and location to the desired arrangement of the containers 16 in the container package. The sheet or web of material is preferably initially flat as illustrated in FIG. 2, although it may be configured to the ultimate shape as illustrated in FIG. 1. Each of the apertures 26 of the carrier element or device 12 are initially of somewhat smaller diameter than the containers 16 so that when a container 16 is inserted through one of the apertures 26, the material adjacent and surrounding each of the apertures 26 will be deflected in the direction of the insertion of the can into a frustoconical or axially directed shape as is depicted in FIGS. 1 and 3–4. This phenomena is characteristic of plastic sheet carrier devices which are disclosed and claimed in the aforementioned U.S. Patent No. 2,874,835.

In positioning the carrier element or device 12 relative to the glass bottles or containers 16, it is preferable that the carrier device 12 engage beneath the annular enlargements 20 of the glass bottles or containers 16 to promote, in conjunction with the resilient gripping function of the frusto-conical or axially directed necks, retention of the containers 16. In like manner, the carrier device 14 is positioned immediately above the annular enlargements 22 adjacent the base or bottom of the glass bottles or containers 16 for the same purpose.

Where a pair of carrier devices 12, 14 are positioned on glass containers 16 in the manner illustrated in the drawing, it is difficult to remove the containers from the package since it is necessary to withdraw the containers from each of the carrier devices. Where a single carrier device is of the type under discussion is used in the multipackaging of containers such as metal cans, it is quite easy to remove a container by simply twisting or canting the container relative to the other containers in the package which causes the container to be cammed past the material adjacent each of the apertures in a manner now well known.

To facilitate removal of the containers 16 from the package, there is provided as an important feature of the present invention, a weakened line 28 adjacent each aperture 16 which is preferably formed on at least one of the carrier devices or elements 12, 14. As shown in the drawing, the carrier device 12 includes weakened lines 28 associated with each aperture 26. Each of the weakened lines 28 extend from the outer periphery of the sheet and generally follow the peripheral configuration of each aperture with which it is associated at least until it passes the longitudinal or transverse midline of the aperture, and then curves toward the aperture where it intersects the inner periphery thereof along an interior margin of the carrier. Each of the weakened lines 28 are preferably perforated and extend through a curvilinear arc of approximately 90° as illustrated in order to prevent inadvertent separation of the carrier device 12 along the weakened lines 28. In this way, the weakened lines 28 do not interfere with the function of the carrier device in circumferentially embracing and resiliently gripping the containers 16 in the manner previously described; however, the weakened lines are available at the moment it is desired to separate the containers 16 from the container package.

In this latter connection, removal of the containers 16 from the container package is easily accomplished by manually prying or separating the containers as shown in FIG. 3 to place the weakened lines 28 under stress and cause tearing to occur along the weakened lines where separation is desired. In general, tearing will begin adjacent the outer periphery of the weakened line and then extend inwardly until intersection and breakthrough with the inner periphery of the aperture 26 with which the container is associated is then completed. With the separation of a glass container or bottle 16 from the carrier device 12, for example, the container, as illustrated in FIG. 3, will then be in a position for removal from the lower carrier device 14 in the now well-known manner. Thus, it may be unnecessary to provide weakened lines in both of the carrier devices 12, 14, although such may be provided if desired.

It will be apparent from the above that a carrier device 12 may be associated with a carrier device 14 of the type illustrated which may or may not have weakened lines, or the carrier device 12 may be associated with other types of carrier devices including paperboard carriers of various types, wrap-around sashes which engage the container sides, and the like.

Where a multipackaging device of the type illustrated in FIG. 1 is contemplated, an integral handle strap arrangement 24 interconnecting the upper and lower carrier devices 12, 14 may be provided. The integral handle strap arrangement 24 comprises a U-shaped carrying handle 26 with the leg portions thereof connected to the upper carrier device 12. The handle strap 24 further is provided with a pair of carrier connecting webs 28, 30 which joins the carrier devices 12, 14 and are initially connected to the U-shaped carrying handle 26 across the frangible section 32, 34. Prior to the carrying of the container package, the handle strap arrangement 24 is positioned as shown in FIG. 1 of the drawing; however, when it is desired to lift and carry the package, the U-shaped handle may be broken away from the carrier connecting webs 28, 30 by severance of the frangible sections 32, 34 due to the weight of the package.

Other types of handle or carrying arrangements are possible and in this connection, there is shown in FIG. 4 of the drawing a separate handle strap 36 in phantom lines which engages containers 16 at opposite ends of the container package along a diagonal thereof. With such an arrangement, it will be unnecessary to use the integral handle strap arrangement 24 which is also shown in phantom lines in FIG. 4 of the drawing.

From the foregoing, it will now be appreciated that the present invention contemplates a new and improved multipackaging device which protects glass bottles or containers against damage or breakage, and yet facilitates separation therefrom in a rapid and positive manner. It is to be understood that the specific examples of the invention as herein shown and described are illustrative only; and various changes in the structure will no doubt occur to those skilled in the art and will be understood as forming a part of this invention insofar as they fall within the spirit and scope of the appended claims.

What is claimed is:

1. A container package comprising a plurality of similarly configured containers arranged in side-by-side substantially abutting relationship, and at least one carrier device for retaining and transporting said containers as a package, said carrier device comprising a substantially unsupported sheet of resilient, deformable and elastic plastic material, said sheet having a plurality of apertures corresponding in number to said containers with the material adjacent each aperture being substantially circumferentially continuous and uninterrupted whereby upon the insertion of containers in said apertures, the material adjacent each aperture is stretched and deformed to the shape of axially directed neck portions which circumferentially embrace and resiliently grip said containers together as a group, said carrier device being provided with a weakened line adjacent each aperture extending from the outer periphery of the sheet and generally following the peripheral configuration of each said aperture at least across the longitudinal or transverse midline thereof prior to intersecting the inner periphery of each said aperture along an interior margin of said carrier device, each weakened line extending through an arc of approximately 90°, whereby stressing of each weakened line causes separation of said carrier device therealong to permit removal of said containers from said carrier device.

2. The container package as defined in claim 1 wherein the weakened lines provided in said carrier device comprise perforated lines.

3. The container package as defined in claim 1 wherein the apertures of said carrier device are arranged in two juxtaposed parallel rows, each weakened line intersecting an associated aperture along the inner periphery thereof at a portion intermediate said juxtaposed rows.

4. The container package as defined in claim 1 and including a pair of carrier devices which are arranged to engage said containers at axially spaced portions along the height thereof, at least one of said carrier devices comprising a sheet of resilient, deformable and elastic plastic material having apertures and weakened portions configured and arranged as aforementioned.

5. The container package as defined in claim 1 wherein said carrier devices are interconnected by an integral handle strap for carrying the package.

6. The container package as defined in claim 5 wherein said integral handle strap interconnecting said carriers is initially positioned against the sides of the container at the end of the package prior to grasping and carrying of said package.

7. The container package as defined in claim 1 and including separate handle means for carrying said package.

References Cited

UNITED STATES PATENTS 2,997,169  8/1961  Poupitch _____ 206—65
3,086,651  4/1963  Poupitch _____ 206—65

MARTHA L. RICE, Primary Examiner

U.S. Cl. X.R.

294—87.2